United States Patent [19]

Wathor

[11] Patent Number: 4,827,440
[45] Date of Patent: May 2, 1989

[54] LOCKOUT FOR TERMINAL KEYS

[76] Inventor: J. Douglas Wathor, 525 Starling Ave., Livermore, Calif. 94550

[21] Appl. No.: 55,281

[22] Filed: May 29, 1987

[51] Int. Cl.⁴ .............................................. G06F 1/00
[52] U.S. Cl. .................................. 364/709.12; 341/23
[58] Field of Search ............. 364/709, 709.01, 709.12, 364/709.5; 340/365 R, 365 E

[56] References Cited

U.S. PATENT DOCUMENTS

| | | | |
|---|---|---|---|
| 4,092,527 | 5/1978 | Luecke | 364/709 |
| 4,140,883 | 2/1979 | Zielke | 340/365 R |
| 4,267,578 | 5/1981 | Vetter | 364/709 |
| 4,688,020 | 8/1987 | Kuehneman | 340/365 R |

OTHER PUBLICATIONS

"Software Security Key", *IBM Tech. Disclosure Bulletin*, vol. 28, No. 11, Apr. 1986, pp. 5108-51 12.

*Primary Examiner*—David H. Malzahn

[57] ABSTRACT

Method and apparatus are disclosed for locking out the keys of a personal computer keyboard such that information conveyed by pressing certain keys are not processed by the PC. The method includes the steps of selecting certain keys to be locked out. A lockout routine is addressed which is used to lock out the selected keys. During the lockout procedure keys are identified which are to be locked out. Keys which are not capable of being locked out are used to change the lockout status of a key or to exit the lockout routine.

6 Claims, 1 Drawing Sheet

LOCKOUT FOR TERMINAL KEYS

BACKGROUND OF THE INVENTION

The present invention is directed in general toward method and apparatus for use with personal computers and, more particularly, toward method and apparatus for locking out selected ones of the keys of a personal computer keyboard.

Personal computers (PCs) have become more and more popular as their availability, cost and dependability become more satisfactory. With the widespread use of personal computers several manufacturers are attempting to provide a univeral device which can be adapted to a variety of uses. To do so, however, it is necessary to provide functions in the universal device which are not required for many applications. This results in several keys being present on the personal computer keyboard which are not needed for the application for which the device is currently being used. It is, however, undesirable to provide keys on a keyboard when the function provided by the key is not being used. This results in unnecessary time being consumed correcting errors when these keys are accidentally pressed.

Some prior art methods for locking out the keys of a keyboard require a plastic insert to be placed in the keyboard to prevent the locked out key from making contact with the contact pad of the keyboard. In this manner, position indicative signals (a plurality of signals whose combination indicate the position of the pressed key) are not transmitted to the personal computer when the locked out key is pressed. However, using this apparatus and method assembly and disassembly of the keyboard is necessary to lock out keys thereby decreasing the useful life of the keyboard. Also, it is difficult and time consuming to lock out a particular key.

Other methods for locking out keys provide a plastic cap or similar device to be placed over the key such that the key cannot be pressed. The plastic caps are, however, unsightly. Further, the caps tend to fall off of the keyboard and are therefore unreliable.

Still other methods for locking out certain combinations of keys, e.g., parental lockout systems on television sets, typically provide a memory for storing the locked out combination. The memory is addressed after each key combination is entered to determine whether the entered combination is locked out. These systems, however, are slow in operation. Further, these systems rely upon a enter key being pressed to acknowledge that a desired combination has been entered. Lastly, it is noted with these systems that keys are not locked out but key combinations are locked out, i.e., the keys are still recognized by the processor.

It is desirable, therefore, to provide method and apparatus for locking out the keys of a personal computer keyboard when their function is not needed. It is also desirable to provide such method and apparatus which is reliable and allows for quick and easy locking or unlocking of the keys of a keyboard.

SUMMARY OF THE INVENTION

It is therefore an object of the present invention to provide method and apparatus for locking out the keys of a keyboard when their functions are not needed.

It is another object of the present invention to provide reliable method and apparatus for quickly and easily locking out the keys of a keyboard when their functions are not needed.

To meet the foregoing objects, the method which is the subject of the present invention comprises the step of responding to a first user input to enter a lockout mode routine. In the lockout mode each key is mapped into a digital signal when it is depressed, i.e., a plurality of position indicative signals are converted to a digital signal indicative of the key which is pressed. Also, the system responds to the position indicative signals to address a lockout mode register and thereby determine the lockout status of the pressed key. The system responds to a first predetermined key to change the lockout status of the pressed key by changing the data stored in the lockout mode register. The system responds to a second predetermined key to exit the lockout mode such that the position indicative output from the keyboard which corresponds to the locked out keys is not mapped into digital signals and therefore are not transmitted to the personal computer.

BRIEF DESCRIPTION OF THE DRAWING

Subject matter which is regarded as invention is particularly pointed out and distinctly claimed in the numbered paragraphs appended hereto. The invention, however, both as to organization and method of practice, may be best understood by reference to the following drawing in which:

DETAILED DESCRIPTION OF THE DRAWINGS

Figure 1:
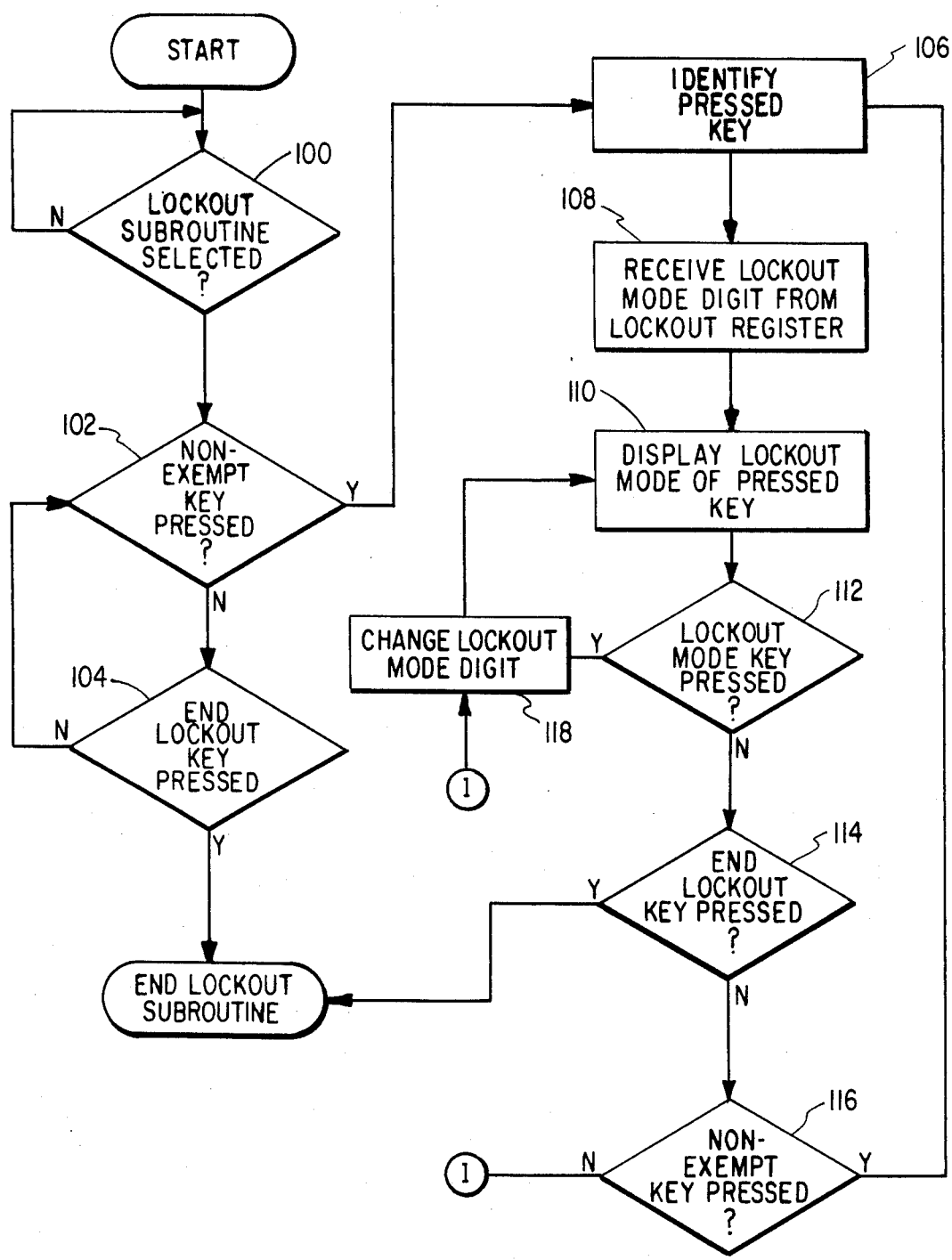
FIG. 1 is a decisional flow diagram illustrating the method by which keys are locked out.

As mentioned above, the present invention is directed toward method and apparatus for locking out selected ones of the keys of a personal computer (PC) keyboard. PCs have recently become popular in office environments as well as elsewhere. Typical PCs include a CRT (cathode ray tube) or other viewing device (sometimes referred to as the monitor) for viewing the program or job being performed. A terminal or processing unit is provided which houses the processing equipment for the PC. The terminal typically includes memory, data processing devices, interfaces, disk drives, ect. A keyboard is also provided for entering the commands to the PC. The subject invention is concerned with locking out the keys of the PC keyboard.

In accordance with the present invention, a lockout routine is provided which can be accessed by the PC supplier or the PC user in any conventional manner. Typically a setup mode is provided for the PC which allows the supplier or user to initialize the terminal for certain applications. The lockout routine may comprise a subprogram of the setup routine.

As shown in the decisional flow diagram of FIG. 1, after the PC enters the setup program, it constantly checks to determine whether the lockup subroutine has been selected, step 100. While entering the lockup subroutine is shown and described herein as a decision which the PC waits for, it will be appreciated by those skilled in the art that this is only for the purpose of illustration and that many other methods for entering the lockup subroutine may be employed. Also, it will be appreciated that other subroutines may be entered while in the setup routine, either before or after the lockup routine is entered.

After the lockout subroutine is entered, the PC proceeds to steps 102 and 104 to determine whether a key which is to be locked out is pressed (step 102) or whether a key is pressed to indicate termination of the lockout mode (step 104). In accordance with the present invention, several exempt keys are provided which cannot be locked out. Each of these keys perform functions which are needed in the lockout mode. One of these keys is an end lockout key which is provided for indicating that the user wishes to leave the lockout mode. If the end lockout key is pressed before any non-exempt key (keys which may be locked out) is pressed (step 104), then the PC exits the lockout mode without altering the lockout status of any non-exempt key. Alternatively, if a non-exempt key is pressed (step 102), then the PC proceeds to step 106 and identifies the key which has been pressed.

Identification may be performed by any known means or method. In the presently preferred embodiment, each key is identified by a mapping procedure which receives as its input a plurality of signals which represent the two dimensional position of the key which has been pressed and provides as its output a digital signal indicative of the key which has been pressed. Apparatus for performing this function is well known in the art. As an example, a multiplexer or other similar device could be used to perform the mapping function.

In addition to providing a binary signal identifying the key which has been pressed, the PC also retrieve a lockout mode digit from the plurality of signals provided from the keyboard (step 108). The retrieved lockout mode digit corresponds to the key which has been pressed and represents the present lockout status of the key. It will be apparent to those skilled in the art that only one binary digit is needed to indicate whether the key is locked out or not. However, more digits could be provided if more information is desired.

After identifying the key which has been pressed and retrieving its lockout status, the PC displays this information to the user, step 110. The PC then waits for the lockout mode key to be pressed, step 112, or for the user to press the end lockout key step 114 (as in step 104), or for the user to press another non-exempt key, step 116. Like the end lockout key, the lockout mode key is one which is exempt from being locked out. When pressed the lockout mode key changes the lockout status of the subject non-exempt key by changing the status of the lockout mode digit stored in the corresponding lockout mode register, step 118.

After changing the status of a non-exempt key, the PC returns to step 110 to display the current status of the subject key. Thereafter, the PC continues to process steps 110–118 until the end lockout key is pressed. When the end lockout key is pressed, the PC exits the lockout routine.

The electronic devices which perform the above mentioned method may be readily provided by those skilled in the art. Indeed the typical PC already contains the necessary devices for performing the method described herein. Alternatively, processing apparatus and memory may be provided at a point preceding the PC electronics for performing the above described method. As an example, custom electronics may be provided in the PC keyboard for performing the method described herein.

While the invention has been described herein by reference to several presently preferred embodiments, it will be apparent to those skilled in the art that many modifications and variations are possible without departing from the true scope and spirit of the invention. It is our intention, therefore, by the appended claims, to encompass all such modifications and variations.

I claim:

1. In a personal computer having a monitor, a processing unit and a keyboard, a reversible method for locking out selected keys of the keyboard such that the processing unit does not respond to the locked out keys when pressed and certain keys are exempt from lockout, the method comprising the steps of:

responding to a first user input to enter a lockout mode;

responding to user selection in the lockout mode of a nonexempt key to either lock out or reverse from lock out status;

identifying the position of the selected key;

addressing a lockout mode register containing the lockout status of the selected key;

displaying the lockout status to the user;

responding to user selection of a first predetermined and exempt key to change the lockout status of the selected key by changing the data stored in the lockout mode register; and responding to user selection of a second predetermined and exempt key to exit the lockout mode.

2. The method as recited in claim 1 wherein the identifying of the selected key in step c further comprises: mapping the position of the selected key, the mapping producing from a plurality of position signals a key identifying digital signal that is transmitted to the terminal.

3. The method as recited in claim 2 wherein the addressing in step d further comprises: responding to the digital signal received from mapping to address the lockout mode register.

4. The method as recited in claims 1, 2 or 3 wherein changing the lockout status to lock out the selected key further comprises: disabling the identification of the position (step c) of a user selected and locked out key.

5. The method as recited in claim 4 wherein the disabling of key identification further comprises: disabling the mapping of the position of a user selected and locked out key.

6. The method as recited in claims 1, 2 or 3 further comprising repeating steps b–f to change the status of a plurality of keys.

* * * * *